US012197163B2

(12) United States Patent
Son

(10) Patent No.: US 12,197,163 B2
(45) Date of Patent: Jan. 14, 2025

(54) LOCKING MECHANISM AND IMAGE FORMING APPARATUS EQUIPPED WITH LOCKING MECHANISM

(71) Applicant: KYOCERA Document Solutions Inc., Osaka (JP)

(72) Inventor: Geki Son, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/282,047

(22) PCT Filed: Feb. 16, 2022

(86) PCT No.: PCT/JP2022/006115
§ 371 (c)(1),
(2) Date: Sep. 14, 2023

(87) PCT Pub. No.: WO2022/201982
PCT Pub. Date: Sep. 29, 2022

(65) Prior Publication Data

US 2024/0167304 A1 May 23, 2024

(30) Foreign Application Priority Data

Mar. 24, 2021 (JP) ................................ 2021-050282

(51) Int. Cl.
*G03G 21/00* (2006.01)
*E05B 57/00* (2006.01)
(Continued)

(52) U.S. Cl.
CPC ......... *G03G 21/1633* (2013.01); *E05B 57/00* (2013.01); *E05B 65/006* (2013.01);
(Continued)

(58) Field of Classification Search
CPC ........... G03G 21/1633; G03G 21/1647; G03G 2221/1687; G03G 2221/169; E05C 3/008;
(Continued)

(56) References Cited

U.S. PATENT DOCUMENTS

2009/0169249 A1* 7/2009 Watanabe ............ G03G 15/326 399/114
2011/0215596 A1* 9/2011 Fagan ..................... E05C 19/12 292/128
(Continued)

FOREIGN PATENT DOCUMENTS

| | | | | |
|---|---|---|---|---|
| JP | 2008032836 A * | 2/2008 | .............. | B41J 29/13 |
| JP | 2010127997 A | 6/2010 | | |
| KR | 200306485 Y1 * | 3/2003 | | |

*Primary Examiner* — Robert B Beatty
(74) *Attorney, Agent, or Firm* — IP Business Solutions, LLC.

(57) ABSTRACT

A cover member includes: a fittable recess that opens to one side of the cover member in a direction orthogonal to an axis of a shaft member, receives a torsion coil spring from the one side, and fits on an outer periphery of the torsion coil spring; and an anchoring counter element to which one end of the torsion coil spring is anchored. The torsion coil spring is engaged with a hook member while being fitted in the fittable recess, thus biasing the hook member toward movement about the axis of the shaft member to a locking position and supporting both ends of the shaft member rotatably around an internal surface of the coil to function as a bearing member.

5 Claims, 10 Drawing Sheets

(51) Int. Cl.
*E05B 65/00* (2006.01)
*E05C 3/00* (2006.01)
*E05C 3/14* (2006.01)
*G03G 21/16* (2006.01)

(52) U.S. Cl.
CPC ................ *E05C 3/008* (2013.01); *E05C 3/14* (2013.01); *G03G 2221/1687* (2013.01)

(58) Field of Classification Search
CPC .......... E05C 3/14; E05B 57/00; E05B 65/006; E05B 2015/0455
See application file for complete search history.

(56) References Cited

U.S. PATENT DOCUMENTS

2012/0074824 A1* 3/2012 Fukui ................. G03G 21/1647 292/195
2017/0060078 A1* 3/2017 Uohashi ............. G03G 21/1633
2019/0265635 A1* 8/2019 Shiina ................ G03G 21/1633

* cited by examiner

LOCKING MECHANISM AND IMAGE FORMING APPARATUS EQUIPPED WITH LOCKING MECHANISM

TECHNICAL FIELD

The present invention relates to locking mechanisms and image forming apparatuses equipped with a locking mechanism.

BACKGROUND ART

Generally, a structure is known in which hook members are used as a locking mechanism for a cover member pivotally movable about one edge of the cover member as a fulcrum (see, for example, Patent Literature 1). This locking mechanism includes a shaft member which extends along the other edge of the cover member opposed to the one edge thereof and is rotatably supported at both ends by the cover member. The hook members with respective engageable hook portions formed at their distal ends are fixed to the shaft member unitarily rotatably with the shaft member. When an access cover is moved to its closed position, the engageable hook portions of the hook members engage with an engageable counterpart provided in a specific location. The hook members are biased, by a biasing member, toward engagement of the engageable hook portions with the engageable counterpart to establish a locking position. A manually operable portion for unlocking the locking mechanism is provided on the cover member. When the manually operable portion is operated, the shaft member rotates toward an unlocking position against the biasing force of the biasing member, which disengages the engagement of the engageable hook portions of the hook members with the engageable counterpart. Both the ends of the shaft member are supported through respective bearing members by the cover member.

CITATION LIST

Patent Literature

Patent Literature 1: JP-A-2010-127997

SUMMARY OF INVENTION

However, the locking mechanism disclosed in Patent Literature 1 requires the bearing members for bearing both ends of the shaft member, which increases the number of parts and thus presents a problem of cost rise.

The present invention has been made in view of the foregoing point and has an object of reducing the number of parts of a locking mechanism including a hook member fixed unitarily rotatably to a shaft member and a biasing member biasing the hook member toward movement about the shaft member by devising the structure of the locking mechanism, thus reducing the production cost.

A locking mechanism according to an aspect of the present invention includes: a cover member openable and closable by pivotally moving about one edge of the cover member as a fulcrum; a shaft member extending along an edge of the cover member opposed to the one edge of the cover member and rotatably supported at both ends by the cover member; a hook member coupled unitarily rotatably to the shaft member and having an engageable hook portion formed at a distal end thereof; an engageable counterpart capable of locking the cover member by engaging with the engageable hook portion of the hook member when the cover member moves to a closed position; a torsion coil spring biasing the hook member toward a locking position of the cover member where the engageable hook portion engages with the engageable counterpart; and a manually operable portion capable of being manually operated with the cover member in the closed position to rotate the shaft member to disengage the engageable hook portion from the engageable counterpart. The cover member includes: a fittable recess that opens to one side of the cover member in a direction orthogonal to an axis of the shaft member, receives the torsion coil spring from the one side, and fits on an outer periphery of the torsion coil spring; and an anchoring counter element to which one end of the torsion coil spring is anchored. The torsion coil spring is engaged with the hook member while being fitted in the fittable recess, thus biasing the hook member toward movement about the axis of the shaft member to the locking position and supporting both the ends of the shaft member rotatably around an internal surface of the coil.

An image forming apparatus according to another aspect of the present invention includes the above-described locking mechanism, a main body provided with the engageable counterpart, and an image forming device that forms an image on a recording medium.

Advantageous Effects of Invention

The present invention reduces the number of parts of a locking mechanism including a hook member fixed unitarily rotatably to a shaft member and a biasing member biasing the hook member toward movement about the shaft member, thus enabling reduction in production cost.

DESCRIPTION OF EMBODIMENTS

Hereinafter, a description will be given of embodiments of the present invention with reference to the drawings. However, the present invention is not limited to the following embodiments.

Figure 1:
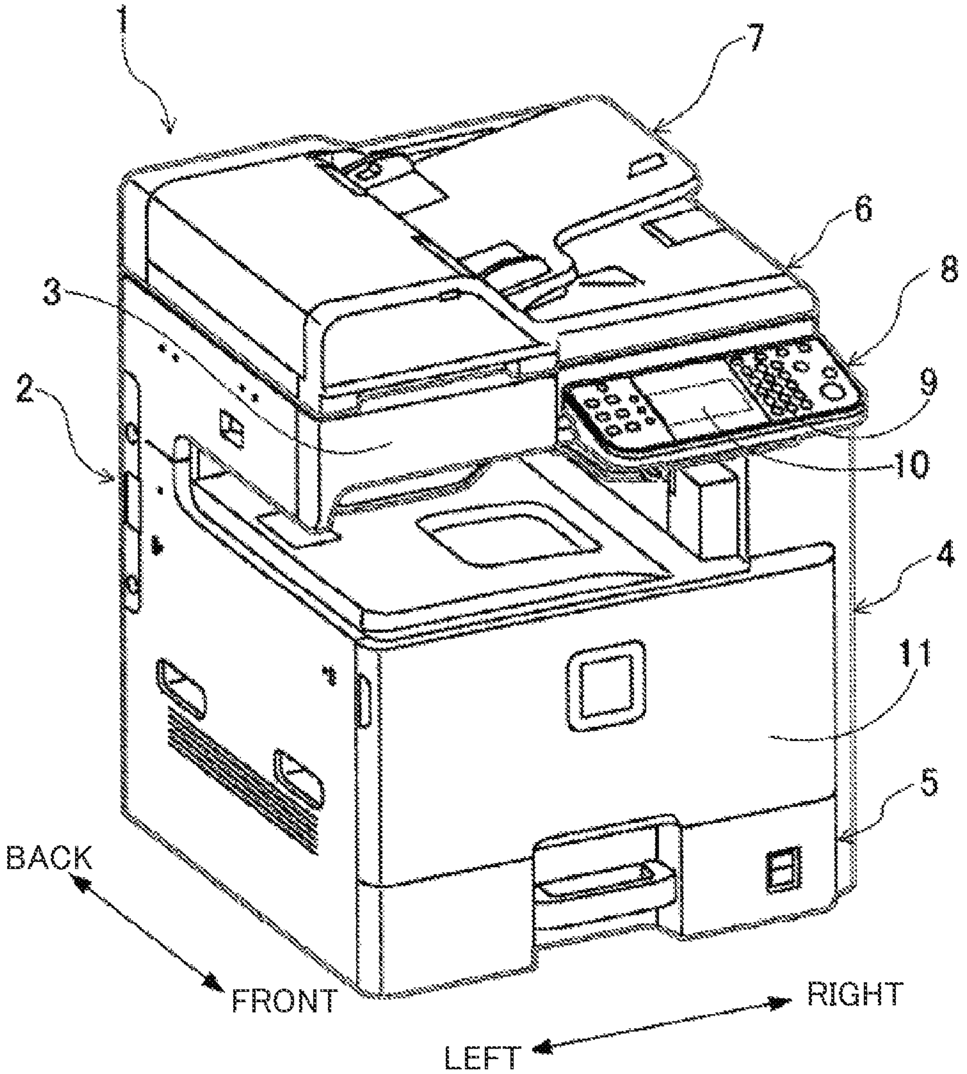
FIG. 1 is an external perspective view showing an image forming apparatus including a locking mechanism according to an embodiment of the present invention.
Figure 2:
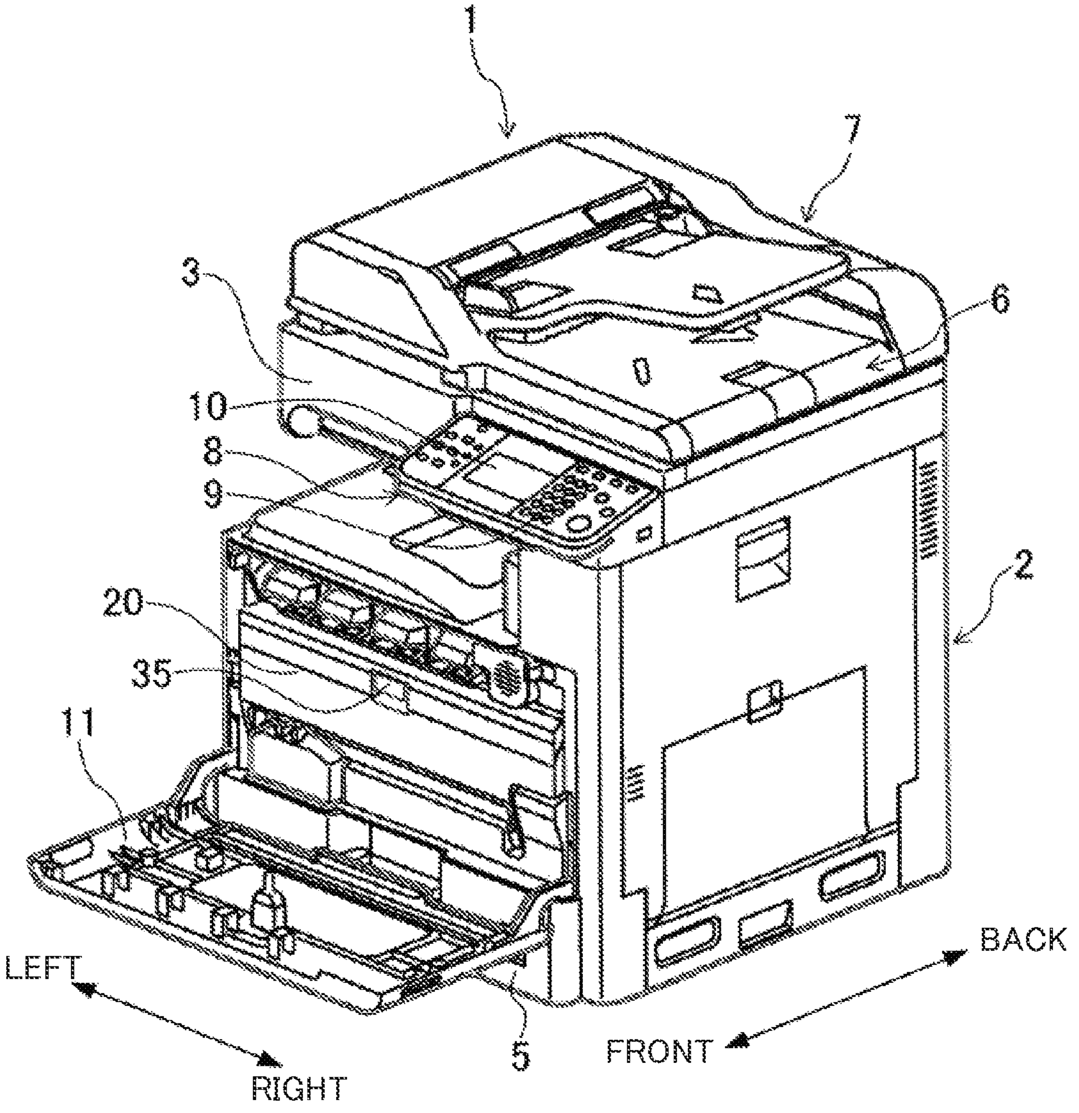
FIG. 2 is an external perspective view showing the image forming apparatus when a main cover is open.

FIG. 1 shows an image forming apparatus 1 including a locking mechanism according to an embodiment of the present invention. The image forming apparatus 1 is an all-in-one image forming apparatus (a multifunction peripheral) having not only a print function but also a scan function, a facsimile function, and a copy function. In the following description, the terms “front” and “back” means the front side and back side, respectively, of the image forming apparatus 1 and the terms “left” and “right” means the left side and right side, respectively, of the image forming apparatus 1 when viewed from the front side.

[Entire Structure]

The image forming apparatus 1 includes an image forming apparatus body 2 and an image reading device 3 disposed on top of the body 2. The image forming apparatus body 2 includes: a printing device 4 disposed in the middle of the body 2 in a top-to-bottom direction thereof, and a sheet feed cassette 5 disposed under the printing device 4. Sheets are contained in the sheet feed cassette 5. The printing device 4 (the image forming device) does printing (image formation), based on predetermined image data, on a sheet as a recording medium fed from the sheet feed cassette 5. The printing process adopted in the printing device 4 is, for example, an electrophotographic process. Specifically, the printing device 4 includes four photosensitive drum units associated with different colors: yellow, cyan, magenta, and black. In each photosensitive drum unit, the surface of a photosensitive drum is irradiated with laser light corresponding to image data to form an electrostatic latent image and the electrostatic latent image is developed by a toner of the associated color. The respective developed toner images of different colors are primarily transferred to the surface of an intermediate transfer belt, superposed on one another, and then secondarily transferred to a sheet fed from the sheet feed cassette 5.

The four photosensitive drum units are contained side by side in the right-and-left direction in the interior of the image forming apparatus body 2 and structured to be insertable into and withdrawable from the image forming apparatus body 2 through the front side thereof. An access cover 20 (an example of the cover member) is provided in front of a containing space for the four photosensitive drum units. The access cover 20 is provided on the internal side of a main cover 11 covering the front side of the image forming apparatus body 2. The access cover 20 is locked in its closed position by a locking mechanism 30 to be described hereinafter.

The image reading device 3 optically reads an image of an original document placed on an original glass plate forming the top surface of the image reading device 3. The top surface of the image reading device 3 is covered openably and closably by a document holding cover 6 for holding the original document. The document holding cover 6 is integrated with an automatic document feed device 7. The automatic document feed device 7 conveys along a predetermined conveyance path an original document loaded on a document feed tray, allows the original document to pass through an image reading position set on the original glass plate, and then ejects the original document onto a document ejection tray. An operation panel 8 is formed on and extends from the front surface of the image reading device 3. The operation panel 8 is provided with: an operation device 9 including a numeric keypad and a Start key; and a display device 10 formed of a liquid crystal display.

[Structure of Access Cover]

Figure 3:
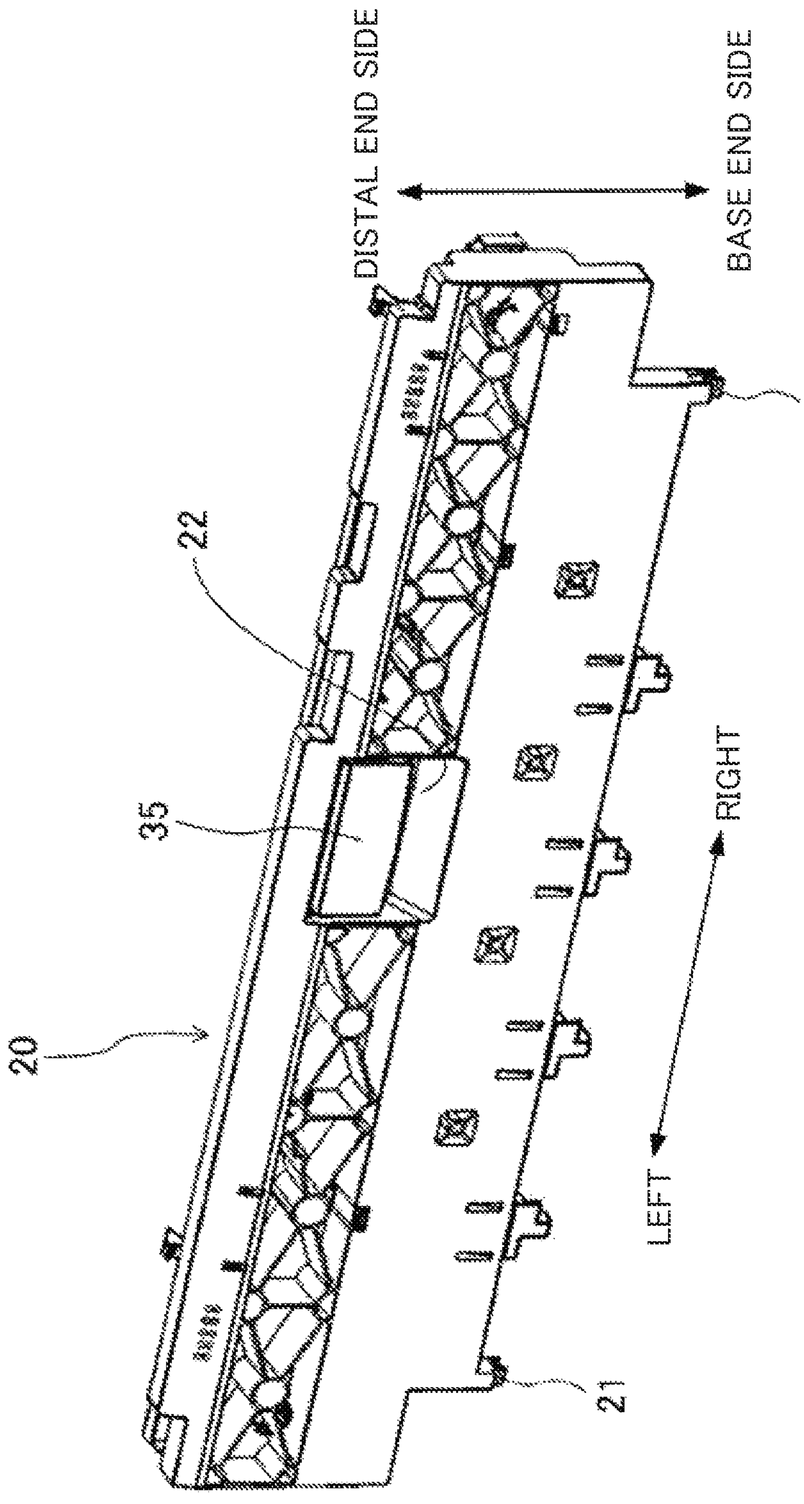
FIG. 3 is a perspective view of an access cover when viewed from the front side.
Figure 4:
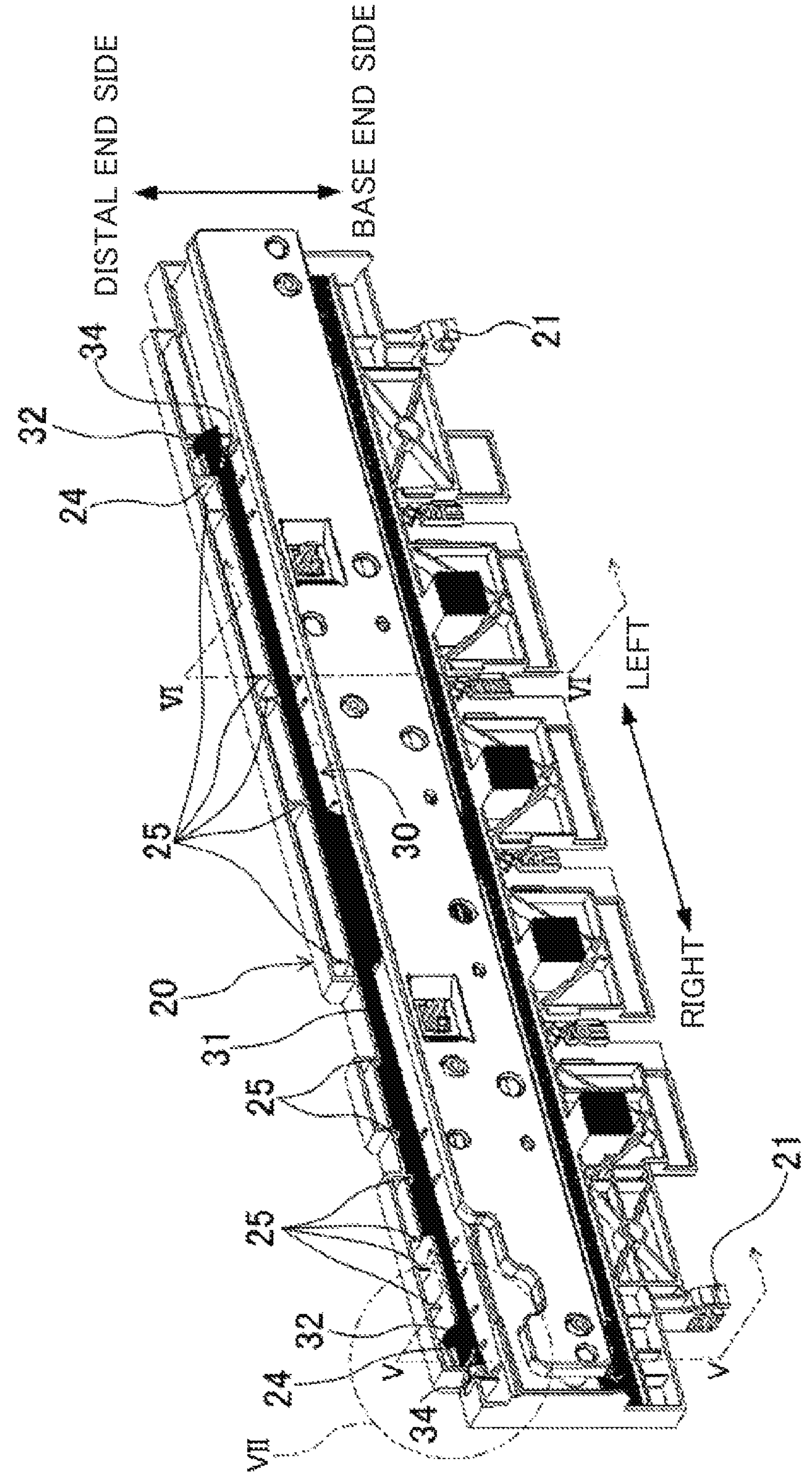
FIG. 4 is a perspective view of the access cover when viewed from the back side.

FIG. 3 is a perspective view of the access cover 20 when viewed from the front side, and FIG. 4 is a perspective view of the access cover 20 when viewed from the back side. The access cover 20 is made of a resin member in a rectangular plate-like shape elongated in the right-and-left direction. Downwardly open U-shaped engaging fulcrum portions 21 are formed at both ends of a base edge of the access cover 20 in the right-and-left direction. The right and left engaging fulcrum portions 21 engage with right and left support shafts, respectively, provided on the image forming apparatus body 2. Each of the support shafts extends horizontally in the right-and-left direction. The access cover 20 is designed to be openable and closable relative to the front side of the above-described containing space by pivotally moving with the right and left support shafts as a fulcrum. In the following description, the side of the access cover 20 where the right and left engaging fulcrum portions 21 are provided is defined as a base end side, while the opposite side to the base end side is defined as a distal end side.

As shown in FIG. 3, a manually operable lever 35 (an example of the manually operable device) is provided in a recess 22 provided in the middle of an external surface of the access cover 20 in the right-and-left direction. The manually operable lever 35 passes through the access cover 20 and is coupled unitarily rotatably to a shaft member 31 of the locking mechanism 30 to be described hereinafter.

As shown in FIG. 4, a pair of end vertical ribs 24 and a plurality of intermediate vertical ribs 25 are formed on a distal end edge of the internal surface of the access cover 20 (an edge thereof opposite to the base end side of the access cover 20).

The pair of end vertical ribs 24 are provided at both the right and left ends of the distal end edge of the access cover 20.

The plurality of intermediate vertical ribs 25 are provided between the pair of end vertical ribs 24 and arranged at spaced intervals in the right-and-left direction. Each of the end vertical ribs 24 and the plurality of intermediate vertical ribs 25 is provided, as shown in FIG. 5, between a horizontal rib 27 extending along the distal end edge of the access cover 20 and a distal end sidewall 28 of the access cover 20.

Figure 5:
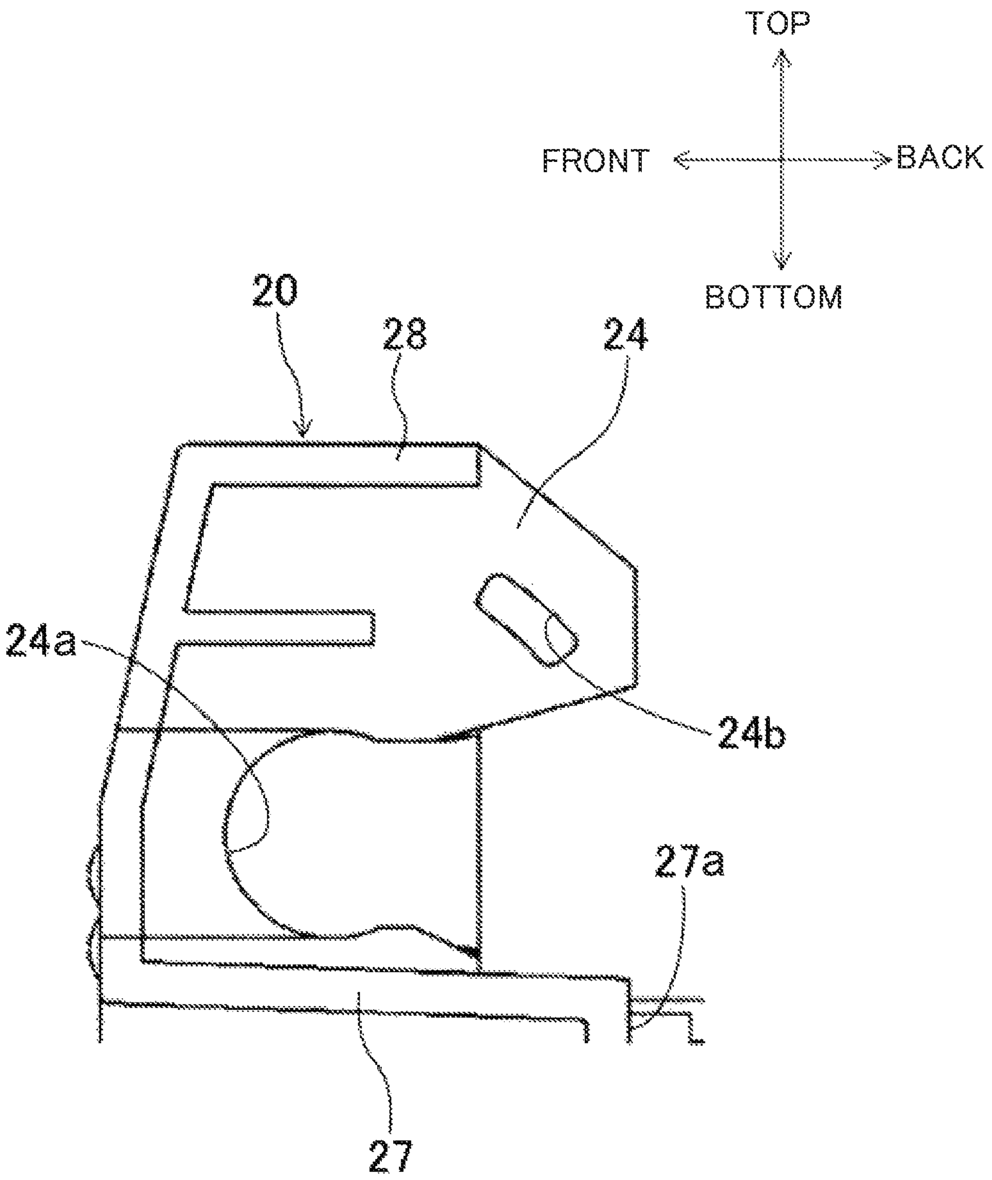
FIG. 5 is a cross-sectional view taken along the line V-V in FIG. 4.
Figure 6:
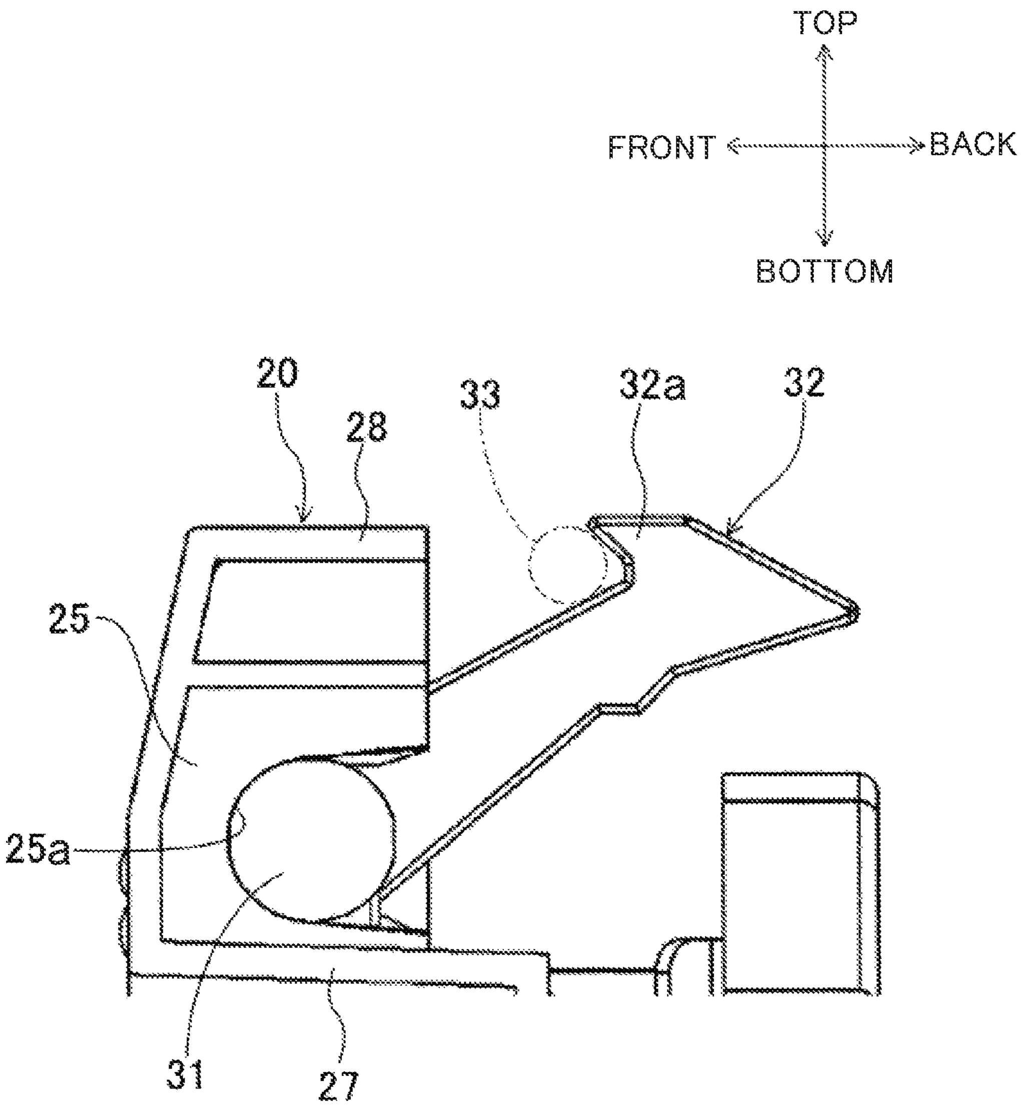
FIG. 6 is a cross-sectional view taken along the line VI-VI in FIG. 4.
Figure 7:
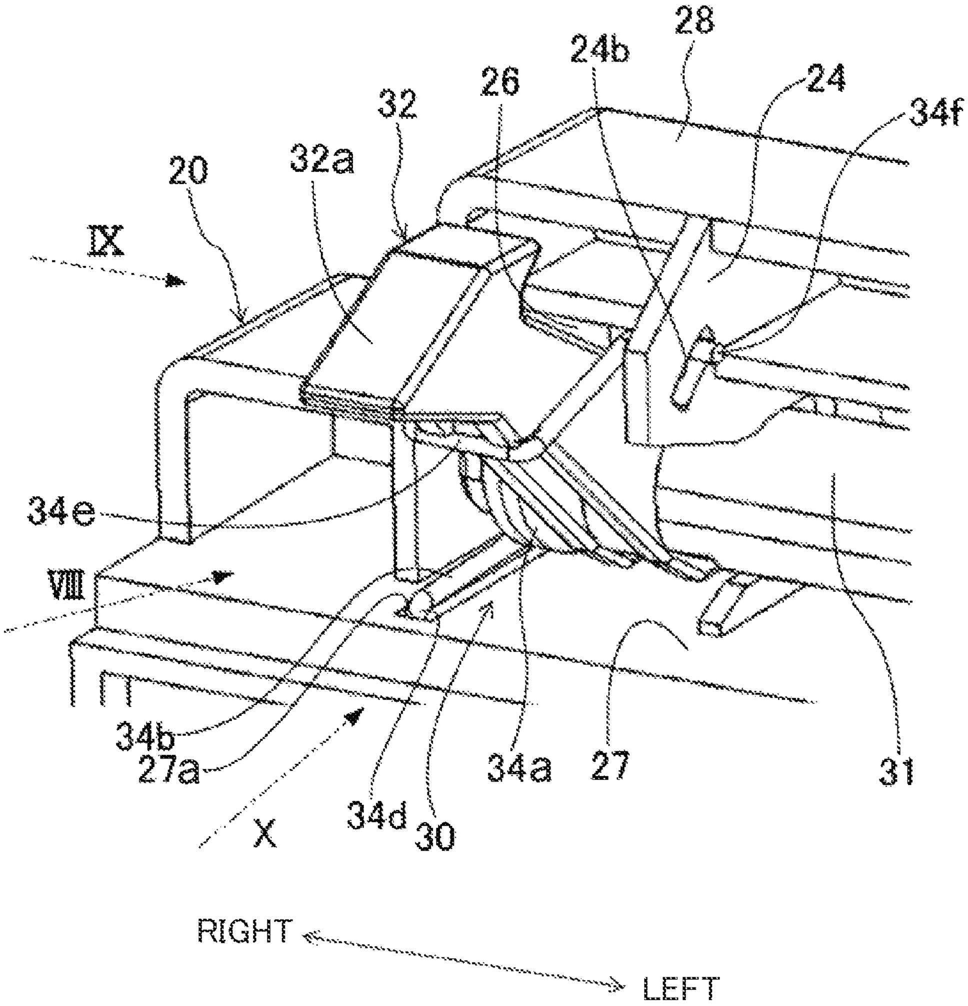
FIG. 7 is an enlarged view showing the portion VII in FIG. 4 on an enlarged scale.
Figure 8:
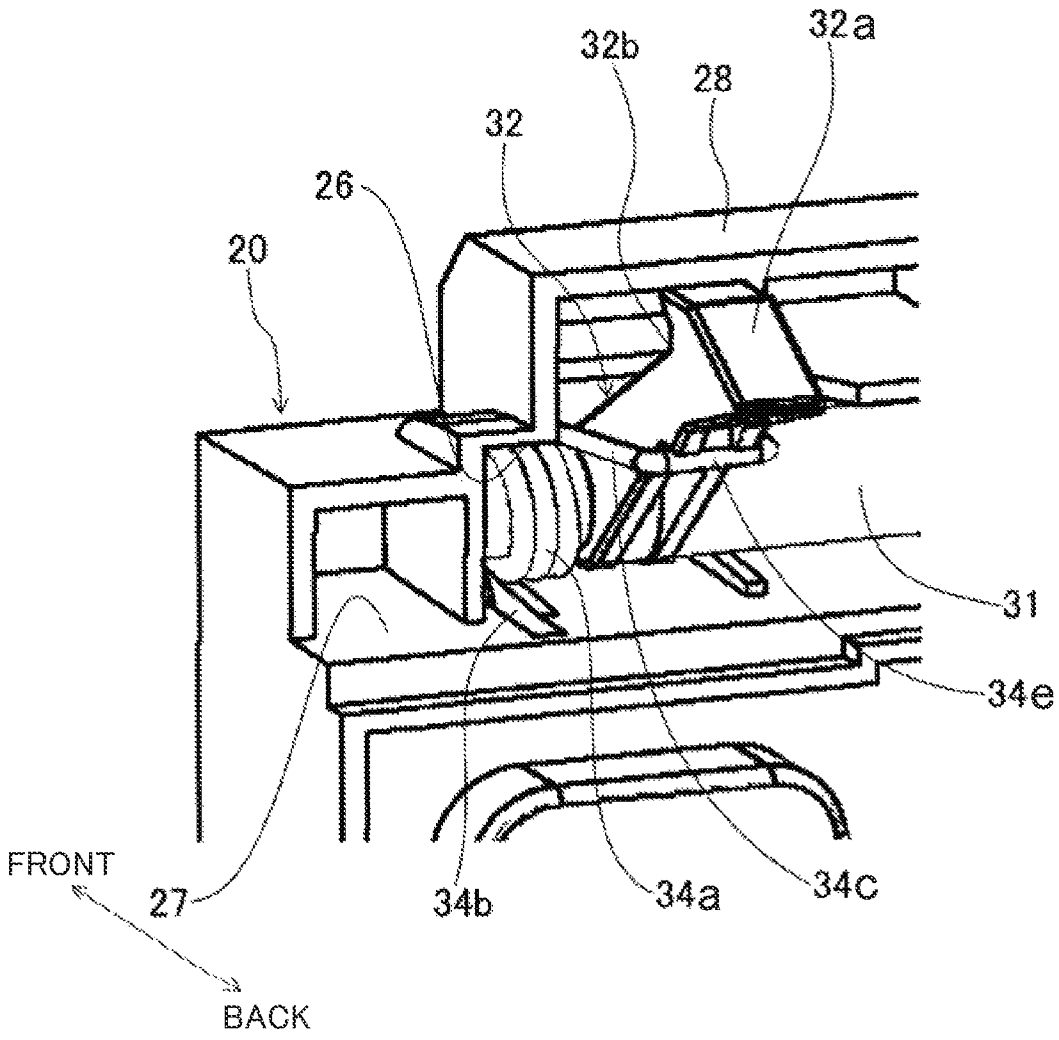
FIG. 8 is a view from the direction of the arrow VIII in FIG. 7.

As shown in FIGS. 5 and 6, each of the end vertical ribs 24 and intermediate vertical ribs 25 has a U-shaped bearing recess 24*a*, 25*a* formed to open to the internal side of the apparatus.

As shown in FIGS. 7 to 10, spring fittable recesses 26 into each of which a torsion coil spring 34 of the locking mechanism 30 to be described hereinafter is to be fitted are formed lateral to the pair of end vertical ribs 24 in the right-and-left direction. The spring fittable recess 26 is formed of a U-shaped recess formed coaxially with the bearing recesses 24*a*, 25*a* and opening to the internal side of the apparatus.

[Structure of Locking Mechanism]

Next, the locking mechanism 30 will be described in detail with reference to FIGS. 7 to 10. Each of the figures shows a state where the access cover 20 is in a closed position. Hereinafter, unless otherwise stated, the description will be given on the assumption that the access cover 20 is in a closed position.

The locking mechanism 30 includes: a shaft member 31 mounted to the distal end edge of the access cover 20; right and left hook members 32 fixed unitarily rotatably to the shaft member 31, and right and left torsion coil springs 34 biasing the respective associated hook members 32 toward movement about the shaft member 31.

Each of the hook members 32 is inclined downwardly toward the back side when viewed from the direction of the axis of the shaft member 31. Each of the hook members 32 has a shape that its distal end is pointed at a sharp angle when viewed from the direction of the axis of the shaft member 31. An inclined surface 32*a* inclined downwardly toward the back side is formed on a back side portion of a top end surface of the hook member 32. An upper end portion of a front end surface of the hook member 32 is provided with a V-shaped engageable recess 32*b* formed to be depressed backward. Each of the hook members 32 is always biased toward upward (counterclockwise in FIG. 9) movement about the shaft member 31 by the torsion coil spring 34.

When the access cover 20 is pivotally moved from its open position toward its closed position (from the left to the right in FIG. 9), the inclined surfaces 32*a* of the hook members 32 abut on an engageable counterpart shaft 33 (see FIG. 9) provided in the interior of the image forming apparatus body 2. When the access cover 20 is further pivotally moved toward the closed position, the inclined surfaces 32*a* are pressed downward by the engageable counterpart shaft 33 and, thus, the hook members 32 rotate clockwise in FIG. 9 together with the shaft member 31. Then, when the access cover 20 reaches the closed position (the position in FIG. 9), the top end surfaces of the hook members 32 have passed over the engageable counterpart shaft 33. Thus, the hook members 32 return to their original positions by the biasing force of the torsion coil springs 34. As a result, the engageable recesses 32*b* (the engageable hook portions) of the hook members 32 engage with the engageable counterpart shaft 33 (the engageable counterpart), so that the access cover 20 is locked against opening. In unlocking the access cover 20, it is only necessary to pull up frontward the manually operable lever 35 (see FIG. 3) provided on the access cover 20. Thus, the shaft member 31 coupled to the manually operable lever 35 is pivotally moved clockwise in FIG. 9, which disengages the engagement of the hook members 32 with the engageable counterpart shaft 33.

In a general locking mechanism, both ends of the shaft member are borne by the bearing members, which increases the number of parts and thus presents a problem of cost rise. To avoid this problem, in this embodiment, the locking mechanism is devised in terms of the mounting structures of the shaft member 31 and the torsion coil springs 34.

[Details of Mounting Structures of Shaft Member 31 and Torsion Coil Springs 34]

The shaft member 31 is disposed to fit in the bearing recesses 24*a* of both the end vertical ribs 24 and the bearing recesses 25*a* of the intermediate vertical ribs 25. Both ends of the shaft member 31 extend laterally beyond both the end vertical ribs 24 and are fitted (inserted) into and supported by the right and left torsion coil springs 34. The right and left torsion coil springs 34 function as bearing members that bear both ends of the shaft member 31.

The torsion coil spring 34 includes a spring body 34*a*, a first linear portion 34*b*, a second linear portion 34*c*, a bent anchoring portion 34*d*, a hook member engagement portion 34*e*, and a guide slit engagement portion 34*f*.

The spring body 34*a* is a helical portion generating a restoring force in the direction of torsion and has an approximately cylindrical shape in appearance. The spring body 34*a* is disposed so that the outer periphery of the spring body 34*a* comes into close contact with the inner periphery of the spring fittable recess 26.

The first linear portion 34*b* and the second linear portion 34*c* extend from both ends of the spring body 34*a* in the direction of the tangent to the spring body 34*a*. The first linear portion 34*b* extends backward from a lower end of the spring body 34*a* when viewed from the direction of the axis of the spring body 34*a*. The second linear portion 34*c* extends backward from an upper end of the spring body 34*a* when viewed from the direction of the axis of the spring body 34*a*.

Figure 9:
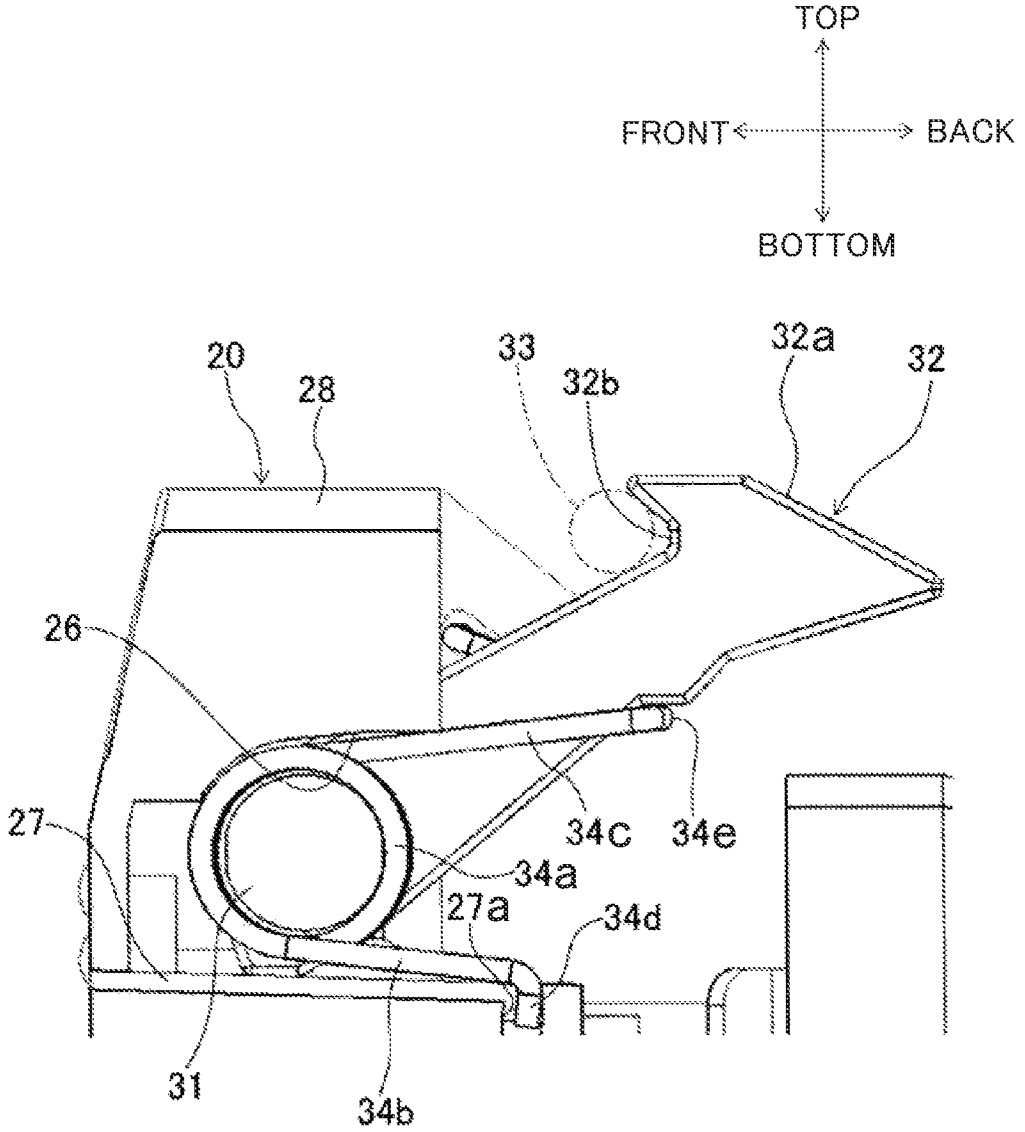
FIG. 9 is a view from the direction of the arrow IX in FIG. 7.
Figure 10:
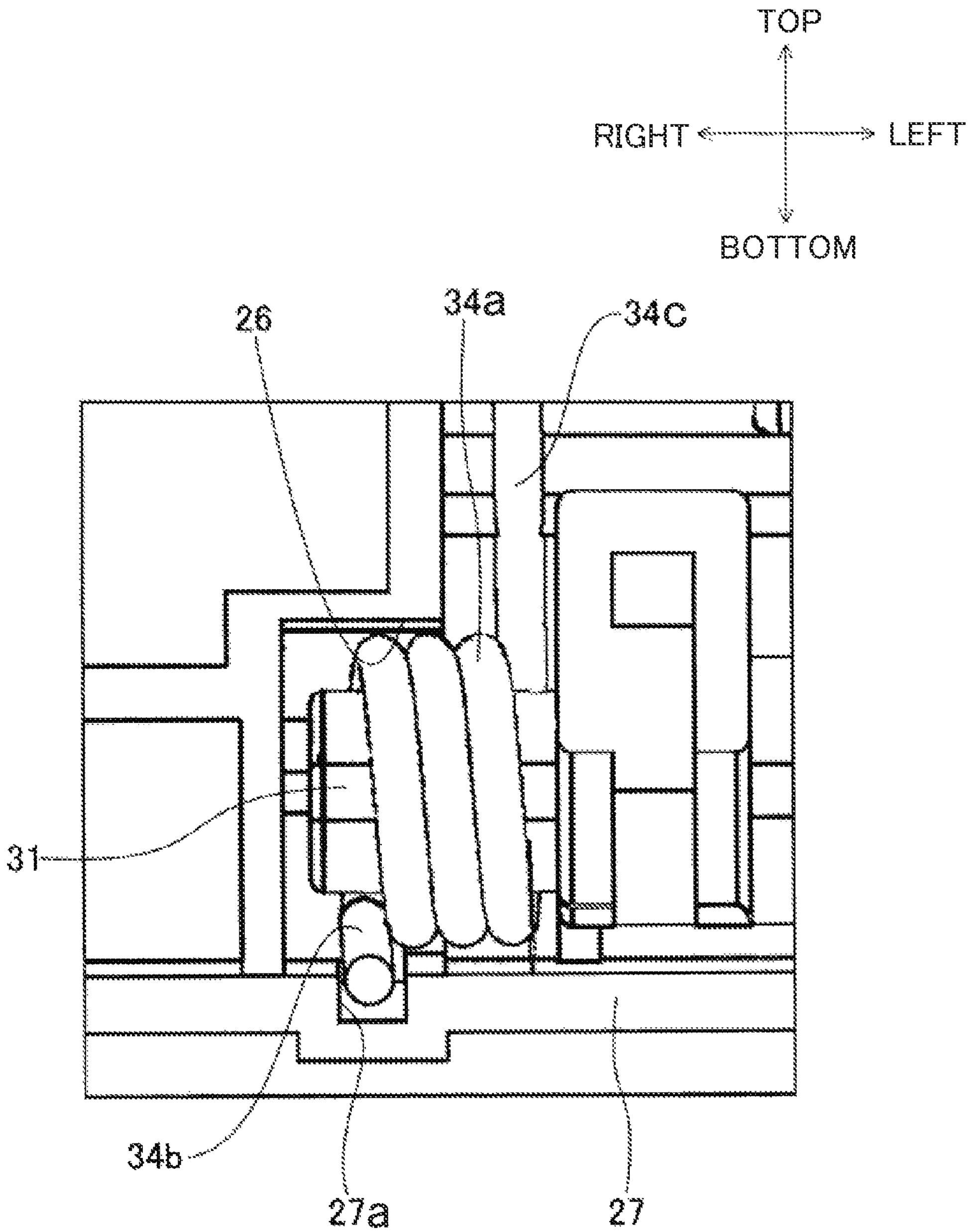
FIG. 10 is a view from the direction of the arrow X in FIG. 7.

The bent anchoring portion 34*d* is continued to a distal end of the first linear portion 34*b* and bent therefrom downward (toward an example of the direction orthogonal to the direction of the axis of the shaft member 31). As shown in FIG. 9, the bent anchoring portion 34*d* abuts on a backside wall surface of an engageable recess 27*a* (an example of the anchoring counter element) formed in the horizontal rib 27. Thus, the spring body 34*a* of the torsion coil spring 34 is given a reaction force to thrust the spring body 34*a* frontward through the bent anchoring portion 34*d*.

The hook member engagement portion 34*e* is continued to a distal end of the second linear portion 34*c* and bent-formed to surround the hook member 32. The hook member engagement portion 34*e* bears against the hook member 32 from below. Thus, the hook member 32 is always biased upward by the torsion coil spring 34.

The guide slit engagement portion 34*f* extends from an end of the hook member engagement portion 34*e* along the direction of the axis of the shaft member 31 (the right-and-left direction). A distal end of the guide slit engagement portion 34*f* passes through a guide slit 24*b* (see FIG. 7) formed in an associated one of both the end vertical ribs 24. The guide slit 24*b* guides the associated guide slit engagement portion 34*f* to allow arc movement of the guide slit engagement portion 34*f* therein in association with swing movement of the hook member 32.

Effects

As thus far described, in this embodiment, the torsion coil springs 34 are engaged with the hook members 32 while being fitted in the spring fittable recesses 26, thus biasing the hook members 32 toward movement about the axis of the shaft member 31 to the locking position and supporting both the ends of the shaft member 31 rotatably around the internal surface of the coil to function as bearing members.

With this structure, since the torsion coil springs 34 for use in biasing the hook members 32 toward the locking position are also used as bearing members supporting the shaft member 31, the number of parts can be reduced and thus the production cost can be reduced.

In the above embodiment, the torsion coil spring 34 includes the helical spring body 34*a*, the first and second linear portions 34*b*, 34*c* extending from both ends of the spring body 34*a* in the direction of the tangent of the spring body 34*a*, and the bent anchoring portion 34*d* continued to the first linear portion 34*b*, bent in the direction orthogonal to the axis of the spring body 34*a*, and engaged and anchored in the engageable recess 27*a*. The torsion coil spring 34 is designed to thrust the spring body 34*a* into the spring fittable recess 26 by a reaction force applied to the bent anchoring portion 34*d* from the wall surface of the engageable recess 27*a*.

With this structure, the torsion coil spring 34 can be securely anchored in the spring fittable recess 26. As a result, the torsion coil spring 34 can be prevented from being fallen off or causing backlash owing to the rotation of the shaft member 31.

In the above embodiment, the access cover 20 includes an arcuate guide slit 24*b* that guides the other end (the guide slit engagement portion 34*f*) of the torsion coil spring 34 to allow movement of the other end therein in association with swing movement of the hook member 32.

With this structure, since the other end of the torsion coil spring 34 is guided (supported) by the guide slit 24*b*, the torsion coil spring 34 can be more securely prevented from falling off and causing backslash.

Other Embodiments

Although in the above embodiment the locking mechanism 30 is applied to the image forming apparatus 1, the present invention is not limited to the above embodiment. The locking mechanism 30 may be applied to any apparatus so long as it includes an access cover 20.

INDUSTRIAL APPLICABILITY

The present invention is useful for a locking mechanism and an image forming apparatus with the locking mechanism and useful particularly when applied to a printer, a facsimile machine, a copier, a multifunction peripheral (MFP) or the like.

The invention claimed is:

1. A locking mechanism comprising:

a cover member openable and closable by pivotally moving about a first edge of the cover member as a fulcrum;

a shaft member extending along a second edge of the cover member opposed to the first edge of the cover member and rotatably supported at both ends by the cover member;

a hook member coupled unitarily rotatably to the shaft member and having an engageable hook portion formed at a distal end thereof;

an engageable counterpart capable of locking the cover member by engaging with the engageable hook portion of the hook member when the cover member moves to a closed position;

a torsion coil spring biasing the hook member toward a locking position of the cover member where the engageable hook portion engages with the engageable counterpart; and a manually operable portion capable of being manually operated with the cover member in the closed position to rotate the shaft member to disengage the engageable hook portion from the engageable counterpart, the cover member comprising:

a fittable recess that opens in a direction orthogonal to an axis of the shaft member, receives the torsion coil spring, and fits the torsion coil spring inside such that an outer periphery of the torsion coil spring contacts the inside of the fittable recess; and an anchoring counter element to which one end of the torsion coil spring is anchored, wherein the torsion coil spring is engaged with the hook member while being fitted in the fittable recess, thus biasing the hook member toward movement about the axis of the shaft member to the locking position and supporting both the ends of the shaft member rotatably around an internal surface of the torsion coil spring.

2. The locking mechanism according to claim 1, wherein the cover member comprises an engageable recess as the anchoring counter element, the torsion coil spring comprises a helical spring body, first and second linear portions extending from both ends of the spring body in a direction of a tangent of the spring body, and a bent anchoring portion continued from the first linear portion, bent in a direction orthogonal to an axis of the spring body, and engaged and anchored in the engageable recess, and the torsion coil spring is designed to thrust the spring body into the fittable recess by a reaction force applied to the bent anchoring portion from a wall surface of the engageable recess.

3. The locking mechanism according to claim 2, wherein the cover member further comprises an arcuate slit that guides another end of the torsion coil spring to allow movement in the slit in association with swing movement of the hook member.

4. The locking mechanism according to claim 2, wherein the torsion coil spring further comprises a hook member engagement portion continued to a distal end of the second linear portion and bent-formed to surround the hook member and the hook member engagement portion bears against the hook member.

5. An image forming apparatus comprising:

the locking mechanism according to claim 1;

a main body provided with the engageable counterpart; and an image forming device that forms an image on a recording medium.

* * * * *